Sept. 1, 1931.    C. Y. KNIGHT    1,821,098
VIBRATION ABSORBING MECHANISM
Filed Nov. 27, 1925    2 Sheets-Sheet 1
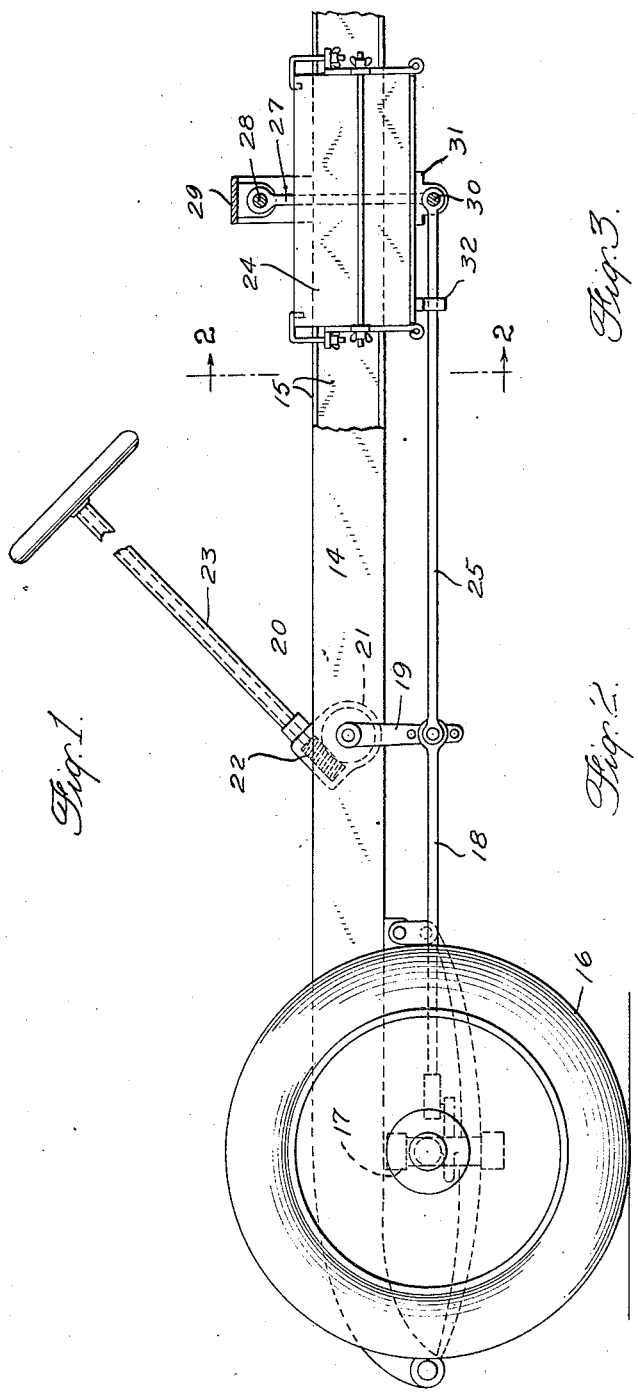
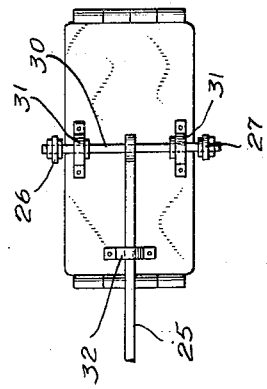
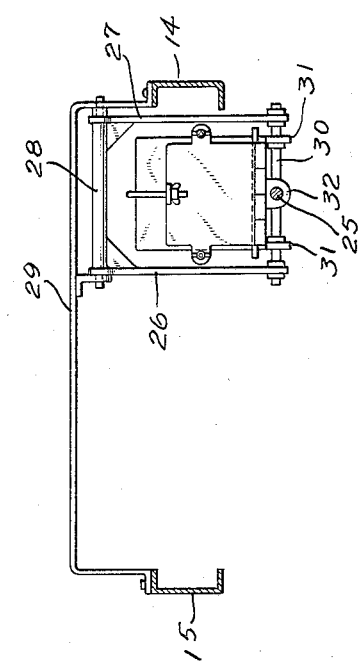
INVENTOR
CHARLES Y. KNIGHT
BY
ATTORNEY Sept. 1, 1931.   C. Y. KNIGHT   1,821,098
VIBRATION ABSORBING MECHANISM
Filed Nov. 27, 1925   2 Sheets-Sheet 2
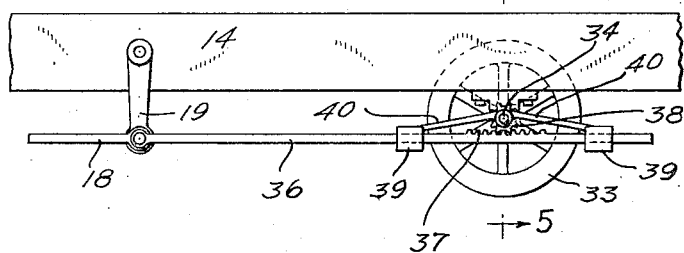
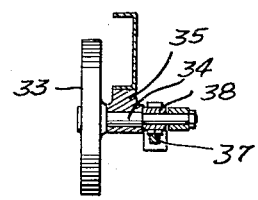
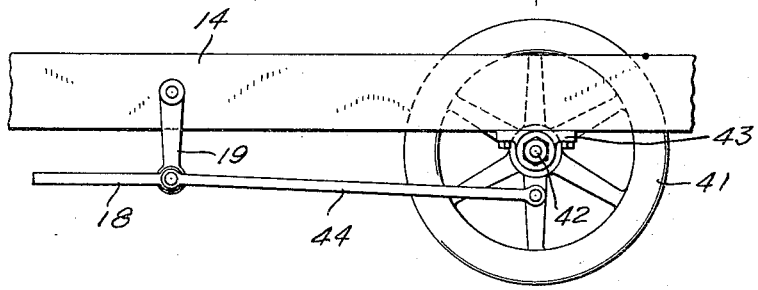
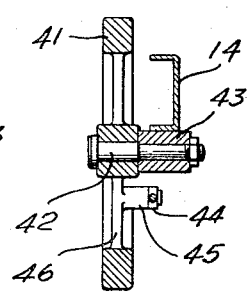
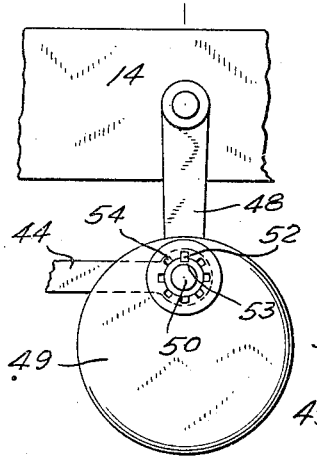
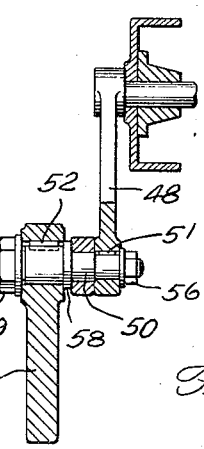
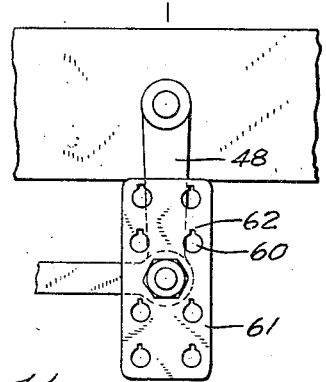
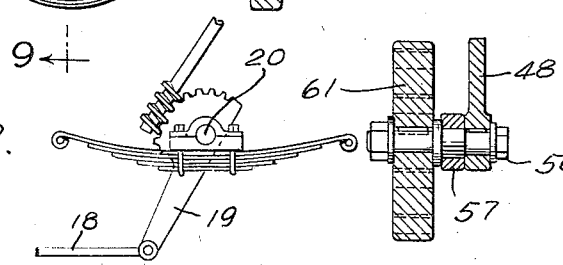
INVENTOR
CHARLES Y. KNIGHT
BY
Chester H. Braselton
ATTORNEY Patented Sept. 1, 1931

1,821,098

UNITED STATES PATENT OFFICE

CHARLES Y. KNIGHT, OF PASADENA, CALIFORNIA, ASSIGNOR, BY MESNE ASSIGNMENTS, TO CHESTER H. BRASELTON CORPORATION, OF JERSEY CITY, NEW JERSEY, A CORPORATION OF DELAWARE

VIBRATION ABSORBING MECHANISM

Application filed November 27, 1925. Serial No. 71,526.

My present invention relates to steering mechanism for vehicles, and more particularly, to a stabilizing device that permits the steering knuckles to be operated from the steering post without appreciable resistance but that offers a resisting or holding inertia to cumulative vibrations and sudden impulses or thrusts imparted to the steering knuckles as the front wheels of the vehicle strike obstructions in the road over which the vehicle travels.

In vehicles, such as automobiles, the front wheels of the vehicle are mounted to turn on a vertical axis on the steering knuckles, this axis being usually slightly to one side of the axis of the wheel. When the vehicle is travelling at a high speed over the road there is a tendency of these wheels to vibrate or "wobble" from various causes, thereby imparting sudden thrusts to the steering gear which is directly connected to the steering knuckle and which, alone, holds the wheels in position. These frequent and sudden thrusts or impulses transmitted to the steering gear impose stresses thereon which tend to cause rapid wear and looseness of the steering gear and a general unsteadiness to the front of the vehicle. These successive impulses thus transmitted to the steering post also cause an unpleasant jerking or vibration in the steering wheel mounted on the steering post.

These disadvantages are obviated by my present invention by which a movable mass is connected to the steering knuckles to oppose an inertia to the thrusts or impulses transmitted from the wheels sufficient to hold them steadily in position while offering little resistance to the slower steering movements transmitted from the steering post.

An object is to provide means by which the effective inertia opposing such thrusts may be multiplied and a maximum of resisting inertia provided with a minimum of weight.

Another object of the invention is to provide a steering gear that will enable vibrations of the steering post to be substantially eliminated.

Still further objects of the invention are to provide a shock resisting inertia for the steering wheels and associated elements that may be adjusted and to provide a steering post mounting that will avoid the transmission to the steering post of shocks that may be transmitted through the steering knuckles and steering gear.

With these and other objects in view, as will appear from the following description, the invention comprises the apparatus described and set forth in the following specification and claims.

The various features of the invention are illustrated in the accompanying drawings in which:

Fig. 1 is a side view of a portion of a vehicle and a steering gear and stabilizer embodying my invention;

Fig. 2 is a cross sectional view of the vehicle and stabilizer taken on line 2—2 of Fig. 1;

Fig. 3 is a bottom plan view of a portion of the stabilizing weight;

Fig. 4 is a side view of a portion of a vehicle and a stabilizing mechanism in which the inertia of a mass is increased or multiplied;

Fig. 5 is a cross sectional view of the stabilizing mechanism of Fig. 4 taken on line 5—5 of Fig. 4;

Fig. 6 is a side view of a portion of the vehicle and a modified form of stabilizing mechanism.

Fig. 7 is a cross sectional view of the vehicle and stabilizing mechanism taken on line 7—7 of Fig. 6;

Fig. 8 is a side view of another form of stabilizing weight;

Fig. 9 is a cross sectional view of the stabilizing weight taken on line 9—9 of Fig. 8;

Fig. 10 is a side view of still another form of stabilizing weight;

Fig. 11 is a cross sectional view of the stabilizing weight taken on line 11—11 of Fig. 10; and Fig. 12 is a side view of a mounting for the cross shaft of the steering gear lever to provide a resilient or shock absorbing support for the steering post.

In my present invention, a relatively heavy mass is movably supported on the vehicle and is directly connected to the steering knuckles so that the sudden impulses imparted to the steering knuckles as the wheels of the vehicle strike obstructions in the road are received directly and opposed by the inertia of the mass. This mass is so arranged that a small but rapid movement of the wheels and steering knuckles is opposed by the inertia of the stabilizing mass and the weight would thus effectively resist any sharp sudden movement. The stabilizing mass would, however, offer substantially no resistance to the slower, long continued movement of the steering post, inasmuch as this slow acceleration of the mass would not involve any considerable change in momentum. The stabilizing mass may consist of some element of a vehicle equipment, such as the storage battery, placed on a movable or slidable mounting and connected by a rigid connection with the steering knuckles, no additional weight being thus placed on the vehicle. Or a small mass may be added and so pivoted or mounted that a relatively small movement of the steering knuckles would give this mass a proportionately large movement and a correspondingly large momentum. There is, moreover, a vertical component to the thrusts imparted by the steering knuckles which tends to cause vibrations in the steering post. To obviate these vibrations, the shaft to which these thrusts are imparted is mounted in resiliently supported bearings that absorb the shocks.

Referring more particularly to the accompanying drawings, the invention is illustrated as applied to a vehicle having a frame with side beams 14 and 15, on which the stabilizing and steering mechanism are mounted, and having front wheels 16. The wheels 16 are mounted on steering knuckles 17 or equivalent steering means of any suitable construction about which the wheels may turn on a vertical axis. The knuckles 17 are, in turn, connected through a connecting rod 18 to a depending steering lever 19. The lever 19 is mounted on a rock shaft 20 journaled in the side beams 14 and 15 of the vehicle frame and having a gear wheel 21 meshing with a worm 22 on the steering post 23. It will be understood that the wheels 16 are pivoted on vertical axes of the steering knuckles 17 and may be turned on these vertical axes by the steering post acting through the worm and gear 22 and 21, rock shaft 20, lever 19 and connecting rod 18. Reversely, when the wheels 16 strike any obstruction in the road, they tend to turn about the axes of the knuckles and thus transmit a thrust backward through the connecting rod 18 to the lever arm 19 and steering gear.

In my present invention, however, the connecting rod 18 and lever 19 are connected to a movable mass 24 by means of a rigid connecting rod 25, so that the rod 18 and lever 19 cannot move without moving the rod 25 and mass 24. The mass 24 is supported from the side beams 14 and 15 by means of a pair of straps 26 and 27, pivoted at their upper ends on a transverse rod 28 supported on a yoke 29 spanning the beams 14 and 15, and at their lower ends having a cross rod 30 on which the mass 24 rests and is held in place by bearing brackets 31. This permits the mass 24 to move horizontally when a thrust or pull is imparted by the rod 25. The mass 24 may be provided in any suitable manner, but to avoid adding additional weight to the vehicle, any mass whose movement on the vehicle is not objectionable, such as the storage battery, may be utilized for this purpose. A guiding loop 32 is provided on the weight 24 encircling the rod 25 to hold the weight in upright position.

Although the mass 24 does not oppose a large resistance to slow movements such as are involved in the steering of the vehicle, inasmuch as the changes in velocity or acceleration involved in such movements are not large, and therefore does not interfere with the steering of the vehicle, it offers however a proportionately large resistance to the sudden, sharp, movements or thrusts imparted to the rods 18 and 25 from the steering knuckle 17 when the wheels 16 strike an obstruction, inasmuch as in the latter case the acceleration or change of movement is very large though very short. The inertia of the mass 24 would offer such a large resistance to the movement of the rod 25 and rod 18 as to constitute in effect a rigid anchorage to the frame 15.

Inasmuch as the resistance offered by the stabilizing object is the product of the mass of the object and the velocity imparted to it by the moving force to be opposed a very heavy mass is not necessary if the acceleration which is imparted to it by a given movement of the force is magnified sufficiently. The weight of the stabilizing mass may be decreased, or its stabilizing effect be increased, therefore, by multifying the movement imparted to it by the movements of the steering knuckles 17.

To this end, the stabilizing weight in the modification shown in Figs. 4 and 5 is made in the form of a flywheel 33 rigidly mounted on a shaft 34 which is, in turn, journaled in a bearing 35 on the lower side of the frame 15, and the movement of the rod 18 and lever 19 are transmitted to the flywheel 33 through a multiplying mechanism in such a manner that a small movement of the rod 18 and lever 19 will cause a relatively large rotation of the flywheel. For this purpose the rod 36 through which the movements are transmitted from the steering knuckles is provided with a rack 37 which meshes with a pinion 38 rigidly mounted on the shaft 34 and having a sufficiently small diameter so that a small movement of the rod 36 and rack 37 will impart a relatively large rotation to the shaft 34 and flywheel 33. The rack 37 is held in meshing relation with the pinion 38 by means of guiding eyes 39 supported by means of arms 40 extending from the bearing 35.

A flywheel 41 is also used in the modification shown in Figs. 6 and 7. In this case, however, the flywheel 41 may be rotatably mounted on a stud shaft 42 secured to the beam 14 by means of a bracket 43, and movement is imparted from the rod 18 and arm 19 directly to the flywheel by means of a connecting rod 44 connecting the end of the rod 18 to a stud 45 on a spoke 46 of the flywheel 41. The distance from the stud 45 to the axis of the wheel 41 is but a portion of the length of the spoke, and accordingly a slight movement of the rod 44 will cause a proportionately large rotation of the wheel 41.

This multiplying of the effective inertia may also be obtained in the modifications shown in Figs. 8, 9, 10 and 11. In these modifications, a mass is mounted on the lower end of an arm 48 swinging from the side beam 14 and also connected at its lower end to the connecting rod 44. In the modification shown in Figs. 8 and 9, the mass 49 is so mounted on the end of the arm 48 that it may be swung towards or away from the axis of support of the swinging arm 48 and then fixed in position so that its center of gravity may be moved towards or away from the supporting and pivoting center of the arm and may be displaced relatively to the lower end of this arm. For this purpose, a transverse pin 50 is keyed onto the lower end of the arm 48 by means of a key 51, and onto the outer projecting portion of this pin the mass 49 is keyed by means of a spline 52, which fits into a groove 53 in the pin 50 and onto one of a series of grooves 54 in an opening 55 in the weight or mass 49 through which the pin 50 projects. By swinging the mass 49 on the pin 50 the center of gravity of the mass may be swung about the pin 50 and moved upwardly and forwardly or rearwardly, as the situation may require. The pin 50 is held on the arm 48 by a nut 56 and a shoulder 57 between which the end of the arm is gripped, and the weight or mass 49 is held on the pin between a flange 58 and a nut 59.

The same result is obtained in the modifications shown in Figs. 10 and 11 by the use of several openings 60 spaced in a rectangular mass 61 and each having a notch 62 to receive the spline 52. In each case the end of the connecting rod 44 may be retained on the pin 50 between the mass 49 or 61 and the arm 48.

The effect of the inertia of the stabilizing masses in the apparatus described above is to provide at each position of the steering gear a stabilizing inertia sufficient to rigidly hold the rod 18 in its proper steering position against the short sharp thrusts which exert but a momentary impulse while permitting the steering positions of the steering gear to be adjusted by the slower, long continued movement of the steering post. In the modifications shown in Figs. 1, 2, 3, 8, 9, 10 and 11, the stabilizing mass is lifted slightly when it is shifted from its mid position, but this lifting is so slight that it does not appreciably affect the steering movements. It is preferably so arranged that the masses are at their lowest point when the wheels 16 are directed straight ahead so that the tendency of the weight is to hold the wheels in a straight ahead course and thus oppose any tendency to turn to one side or the other.

When perfectly stabilized, no thrusts or vibrations will be transmitted to the steering post. To remove any residual vibrations that may be transmitted to the post, however, the mounting shown in Fig. 12 may be provided for the steering post and related steering gear. In this mounting the gear shaft 20 is journaled in a bearing 63 which is supported on a spring 64 mounted at its ends on the side beam 14. The shaft 20 carries a gear wheel 21 meshing with the worm 22 on the steering post 23 in the usual manner. When a thrust is transmitted through the rod 18 to the end of the arm 19, the turning of this arm tends to cause a displacement between the positions of the shaft 20 and worm 22 of the steering post 23. By providing a yielding support for the shaft 20, the shaft 20 moves rather than the worm 22 and steering post 23 and the steering post is protected against vibrations.

Through the above invention, therefore, the wheels are not only kept and held rigidly in their proper positions against the impulses caused by obstructions in the road, but any vibrations that may be transmitted to the steering gear are absorbed without being further transmitted to the steering post.

As changes of construction could be made within the scope of my invention, it is desired that all matter contained in the above description or shown in the accompanying drawings shall be interpreted as illustrative and not in a limiting sense.

Having described my invention, what I claim and desire to secure by Letters Patent is:

1. Apparatus of the type described which comprises a steering knuckle; an operating and moving rod for said steering knuckle; a stabilizing mass; a pivot support and straps for swinging said stabilizing mass from said pivot support to permit said mass to swing back and forth; and a connecting rod fixedly connecting said mass to said operating rod.

2. Apparatus of the type described which comprises a steering knuckle; a stabilizing mass supported independently of said steering knuckle; a fixed support; a rod pivotally mounted on said support and having pivotal connection with said stabilizing mass whereby said mass normally maintains said rod in approximately vertical position due to the weight of said mass; and means for fixedly connecting said mass to said steering knuckle.

3. Apparatus of the type described which comprises a steering knuckle; a storage battery; a swinging support for said storage battery; and means for fixedly connecting said storage battery to said steering knuckle.

4. Apparatus of the type described which comprises a steering knuckle; a swinging arm supported independently of said steering knuckle; a mass rigidly mounted on the free end of said swinging arm and adapted to hold said swinging arm in approximately vertical position; and means for fixedly connecting said arm to said steering knuckle.

5. In apparatus of the type described, a steering knuckle having a normal position in which movement of the vehicle carrying the apparatus is restricted to a straight path; a swinging arm supported independently of said steering knuckle; a mass rigidly mounted on the free end of said swinging arm, said arm being thereby normally held in vertical position; and means for fixedly connecting said arm to said steering knuckle, said steering knuckle being in its normal straight path position when the swinging arm is in approximate vertical position.

6. Apparatus of the type described which comprises a steering knuckle; a swinging arm; a pin rigidly mounted on the free end of said swinging arm; a mass mounted on said pin eccentrically of its center of gravity; said pin having a groove; a spline in said groove; and a series of centered grooves in said mass to receive said spline.

7. Apparatus of the type described which comprises a steering knuckle; a swinging arm; a pin rigidly mounted on the free end of said swinging arm; and a mass adapted to be mounted in positions on said pin to bring the center of gravity in different positions relative to the pivotal center of said swinging arm.

8. Apparatus of the type described which comprises a steering knuckle; a swinging arm; a pin mounted on the free end of said swinging arm; and a mass having a series of spaced openings through which said pin may be inserted to mount said mass in various positions on said arm.

9. Apparatus of the type described which comprises a steering knuckle; a swinging arm; a pin mounted on the free end of said swinging arm; and a stabilizing mass having series of spaced holes, each of said holes having a notch, and each of said holes being adapted to receive said pin, and a spline on said pin adapted to fit into said notches.

10. Vehicle steering apparatus comprising a member movable with the steering wheels of a vehicle, a weight connected to said member, and means to support said weight from the frame of said vehicle for forward and rearward movement against the action of gravity, said weight being in repose when the wheels of said vehicle are straight.

In testimony whereof, I affix my signature.

CHARLES Y. KNIGHT.